United States Patent Office 3,803,326
Patented Apr. 9, 1974

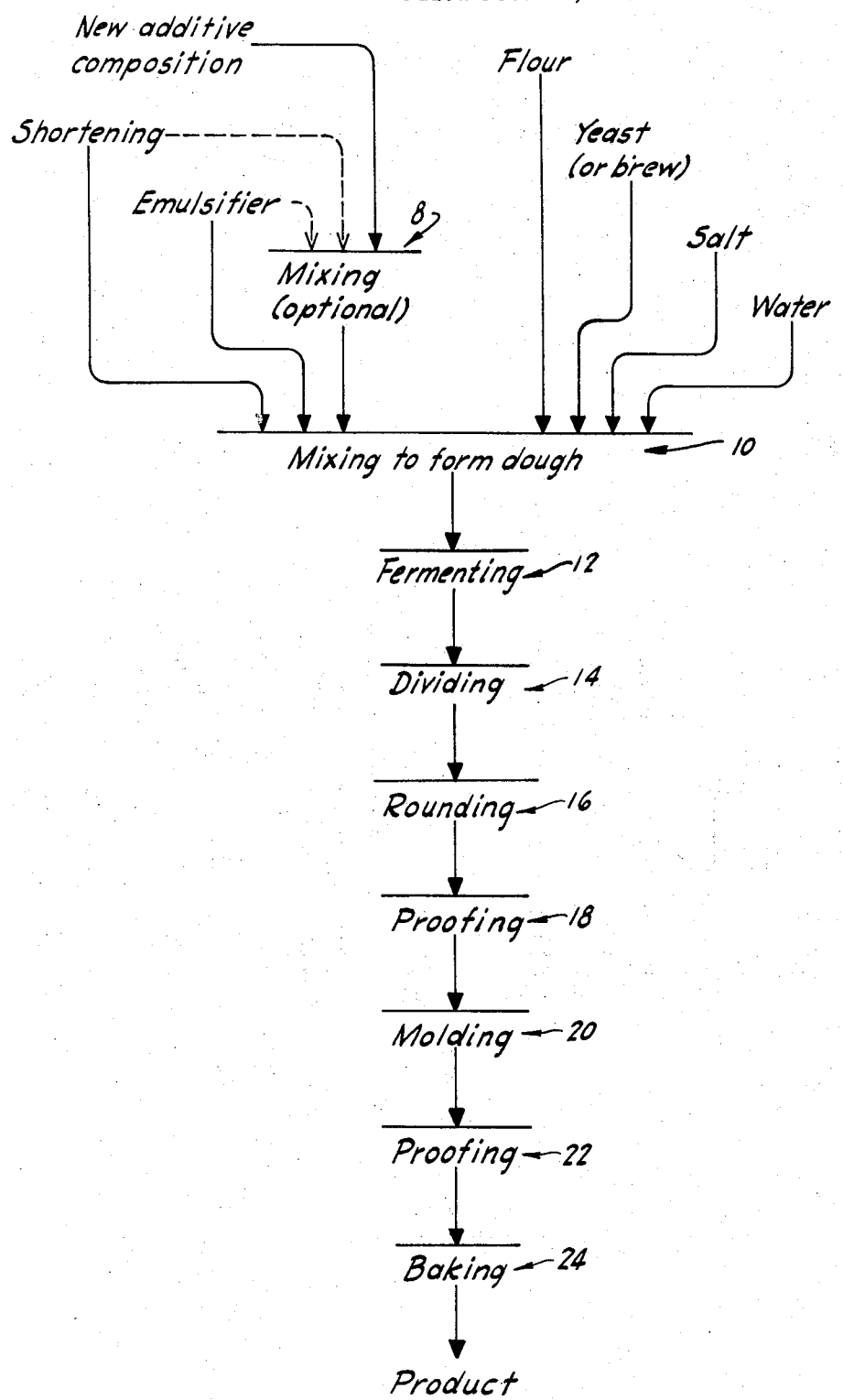

3,803,326
BREAD PROCESS AND ADDITIVE
COMPOSITION THEREFOR
Theodore Warren Craig, Lafayette, and Richard Grant Henika, Alamo, Calif., assignors to Patent Technology, Inc., San Francisco, Calif.
Filed Feb. 29, 1972, Ser. No. 230,421
Int. Cl. A21d 2/28, 2/34, 2/36
U.S. Cl. 426—21
17 Claims

ABSTRACT OF THE DISCLOSURE

A highly adaptable process for making leavened bread, rolls, buns, sweet goods, with controlled but greatly reduced mixing and fermentation requirements, to provide bakery products of desired reproducible characteristics as needed for different markets. The processing to produce loaves for baking requires no more than 60 to 90 minutes. The processing involves mixing conventional dough ingredients including flour, yeast, salt and water with an additive composition consisting of a mixture of (a) amino acid reducing substance containing free sulfhydryl groups (b) dried whey (c) ascorbic acid and (d) dried soya protein. Only a small amount of additive composition is required ranging from 0.25 to 0.5% on the weight of the flour. The new additive composition may be added dry as a separate ingredient or as a slurry or paste derived by combining the additive composition with one of the dough ingredients (e.g., shortening and/or emulsifier). The active ingredients of the additive composition make it highly adaptable to flours and doughs of different characteristics merely by variation in the proportion of the additive within the indicated range.

BACKGROUND OF INVENTION

Considerable research energy and time have been expended in efforts to provide a short time process which would produce a so-called "no time" dough. To date, despite the obvious benefits to be obtained, these efforts have not achieved commercial acceptance because of the generally inferior quality of the bread produced. Consequently, until recently, bread and rolls were largely produced by the sponge and dough procedure, with some bread also being made by the straight dough process. As is well known, the prevalent sponge and dough technique is subject to many disadvantages. Chiefly, it is wasteful of much time as well as space required in the fermentation processing. Fermentation also converts valuable flour solids to volatile products which are lost. In addition, the process exposes masses of dough to spoilage in the event of a shutdown.

In the past decade, considerable progress has been made in methods for chemically developing the dough. One satisfactory method introduced in the United States in 1962 makes use of an additive containing relatively high levels of cysteine plus potassium bromate in a whey carrier. With this technique, fermentation times and requirements are not completely eliminated but are greatly reduced. Ascorbic acid has also been used as a dough improver which, in the presence of oxygen and water, is oxidized and becomes an oxidizing agent similar to bromate. Since ascorbic acid is a necessary vitamin (Vitamin C) and cysteine is a naturally occurring amino acid, no problems are presented by using these ingredients at reasonable levels in bread doughs and other foods.

Notwithstanding the benefits to be obtained from use of bread improvers of the type described, viz., cysteine and ascorbic acid, effective use of such ingredients has been impaired by an inability to readily employ their beneficial characteristics in different dough systems. For example, breads and doughs which might be highly successful in the United States or Canada, are frequently unsatisfactory for European markets. Thus, English consumers prefer a relatively heavy, dense loaf of the type that can be made by bulk fermentation processes. Consumers in Holland prefer a loaf of relatively high volume with less process with slow speed batch mixers. In contrast, German breads differ significantly from both the American and English type breads in that they are made with high levels of rye and whole wheat flours, are exceedingly dense and compact and have very low volume and open grain quality. The shelf life of such breads is very short with the result that there is an increase in import of Dutch white breads into Germany for toasting purposes. Similar marketing differences exist in regional areas of the United States.

Because of the indicated differences in consumer preference, and the differences in the processes adapted to satisfy consumer demand, there is a definite need for a bread improver which will provide a high degree of flexibility in the processing as well as an adaptable variability in the product quality to meet existing market conditions in various areas. Since existing dough formulations containing bread improvers are invariably tailored to a particular market condition, the provision of a bread improver composition which could be effectively employed in different bread processes and in different dough systems is highly to be desired.

SUMMARY OF INVENTION AND OBJECTS

The present invention relates generally to a short time process for making leaven bread and like bakery products of variable but desired reproducible characteristics, and with controllable although greatly reduced mixing and fermentation requirements. The invention particularly relates to an improved additive composition for controlling the processing as well as the product characteristics in a short time process, and making use of but a single mixing step so as to avoid the disadvantages of the sponge and dough technique.

As noted above, presently available compositions of ingredients for improving dough and product characteristics are relatively inflexible in use and restricted to particular bakery processes. The present invention seeks to overcome this difficulty by providing an improved dough additive composition wherein use is made of a blend of separate, readily available food ingredients. Specifically, it has been found that a blend of ingredients comprising (a) an amino acid reducing substance containing free sulfhydryl groups, viz., L-cysteine HCl (b) dried whey (c) ascorbic acid and (d) dried soya protein, viz., defatted soya flour, provides highly beneficial results. Such additive composition is most easily employed as a dry blend of the various ingredients in optimum proportions, but may also be employed in combination with one or more of the dough ingredients, as a slurry or paste.

The blend of the ingredients in the new additive composition is such that the composition is customarily used within the range from 0.25 to 0.5% on the weight of the flour, but may be varied downward or upward within this range as may be necessary to adapt to the particular characteristics of the dough system. For example, the amount may be varied to accommodate a particular flour (e.g., low protein versus high protein), or different dough mixes according to their mixing efficiency. The obtaining of a particular characteristic in the finished loaf of bread, for example, a tight or open grain, or a desired specific volume (e.g., low or high), may likewise be influenced by modest changes in the additive level within the specified range. It has been found that the foregoing effects are readily obtained with the new additive composition with relatively minor adjustments as may be necessary in the particular dough and bread system.

In general, therefore, it is an object of the present invention to provide a new improved, short time process for making leaven bread, rolls, buns, sweet goods, and like bakery products, in which variably optimum dough and product characteristics are obtained in a novel manner.

Another object of the invention is to provide a novel short time process of the above character wherein both the time and effort required for mixing to form a dough, and for fermenting the dough units prior to baking, is greatly reduced.

A further object of the invention is to provide a novel additive composition consisting of a blend of four separate ingredients, such composition providing a high degree of flexibility in adapting the composition to differing processes to provide bakery products of varying desired final characteristics.

Further objects and features of the invention will appear from the following description in which the preferred embodiments have been set forth in detail in conjunction with the accompanying drawing.

BRIEF DESCRIPTION OF THE DRAWING

The drawing is a flow sheet illustrating an improved short time process according to the present invention, as particularly related to the production of leaven bread.

DESCRIPTION OF PREFERRED EMBODIMENTS

The drawing illustrates one procedure for carrying out the improved short time process of the present invention. Essential ingredients for making leaven bread and like bakery products, including flour, yeast [1], salt and water, are mixed in Step 10 together with the new additive composition, to form a dough. According to one specific procedure, all of the ingredients except water are dry blended in Step 10 for a relatively short period of time (e.g. 2 minutes, at low speed), following which the mixing is completed with addition of the water (e.g., within a period of about 8 to 15 minutes). A particular advantage of use of the additive composition of the present invention is that it makes possible use of a single low energy batch mixing step, as represented in the drawing at 10.

Following the mixing, the dough may be subjected to a short period of fermentation in Step 12, divided in Step 14, rounded in Step 16, subjected to intermediate proofing in Step 18 (e.g., 12 to 20 minutes), molded in Step 20, and subjected to final proofing in Step 22 (e.g., 40 to 60 minutes). In such processing, according to the present invention, it is possible to reduce the total time required for mixing, fermentation, and proofing prior to bake (i.e., Steps 20 through 22) as much as 40 to 100 minutes, with the result that the total time through mixing, dividing and proofing may require no more than about 60 to 90 minutes. As noted hereafter, the foregoing advantages are made possible through use of the new additive composition which may be added directly to the mixing Step 10 or, alternatively, as represented at Step 8, be mixed preliminarily with the shortening, emulsifier and/or other ingredients (e.g., salt, sugar, fat, etc.) to provide an additive composition in a convenient slurry or paste form.

In general, the described processing is highly adaptable to making a wide range of leaven breads, rolls, buns, sweet goods and like bakery products, in greatly reduced periods of time. Such result is obtained by introducing the new additive composition (during the mixing to form the dough) in preselected controlled amounts within the general range from about 0.25 to 0.5% on the weight of the flour. Following the abbreviated mixing, dividing and proofing steps, as described above, the dough units are subjected to a conventional baking cycle, represented at Step 24, to produce bakery products having the desired final characteristics. As noted, particular characteristics of the final products may vary with the proportion of additive composition in accordance with the demands of a particular market.

Successful use of the new additive composition in carrying out the short time bakery process of the drawing therefore depends upon the cooperative contributions of the several components making up the additive composition, viz., the amino acid reducing substance (cysteine or glutathione), dried whey, ascorbic acid, and dried soya protein. Application of this new additive composition to the preparation of breads of acceptable quality for various commercial markets is considered to be entirely unique, and the high degree of flexibility or adaptability of the new additive composition for such purpose constitutes an essential novel feature of the invention.

While it is believed that each of the components of the additive composition contributes separately to its cumulative effect, the results obtained are not merely additive nor to be expected from known uses and effects of the separate ingredients. To the contrary, the four components of the additive composition individually contribute in a way which is not entirely understood, and provide entirely new and unexpected results. Thus, while cysteine and ascorbic acid have long been recognized as dough or flour improvers, their combined effect is only partially responsible for the beneficial effects of the additive composition, and could not achieve such effects in the absence of the added, relatively small proportions of dried whey and soya protein. By way of illustration, elimination of whey from the additive composition not only causes the specific volume of the finished loaf to deteriorate, but also necessitates longer proof times than when the whey is present. Likewise, it has been demonstrated that the particular blend or proportion of whey and soya in the additive composition is important to achieving a desired final specific volume in the finished loaf; also, that elimination or reduction of the soya content effects a decrease in the loaf volume and an increase in the time required for mixing. In like fashion, it can be demonstrated that the decreased mixing and proofing requirements in the short time process are not merely attributes of the cysteine, or the cysteine combined with the ascorbic acid, but rather arise from a balanced combination of the four ingredients in the new additive composition.

In the practice of the present invention, specific ingredients for use as components in the new additive composition can be selected to conform to other necessary requirements without detracting in any way from the desired results obtained. Thus, natural foods such as inactive dry yeast, unheated soy flour, or other natural foods, may be used as sources of cysteine and/or glutathione. In like fashion, dried whey for use in the additive composition may be obtained as a byproduct of commercial dairy operations, such as the manufacture of cheese. Sources of soya protein can include commercially available defatted soya flours or flour concentrates. Ascorbic acid can similarly be obtained from commercial sources of Vitamin C. While best results will be obtained by selecting the specific ingredients for use in the additive composition to conform with specific requirements of the particular dough system or bakery product being produced, the invention generally contemplates the use of an additive composition making use of commercially available ingredients without other specific limitations.

With reference to the particular ingredients, amino acids containing free sulfhydryl groups and having reducing properties adapted to use in the present invention include compounds selected from the group consisting of cysteine and glutathione, or combinations of these ingredients. Specific compounds found to be highly satisfactory include L-cysteine hydrochloride and glutathione. These compounds are sulfur containing type reducing agents, having free sulfhydryl (—SH) groups, and are neither toxic nor form any toxic or otherwise objectionable byproducts with other ingredients in the mix. Satisfactory

---

[1] Fast or slow acting.

amino acid reducing substances according to the invention include compounds related to or homologous with L-cysteine hydrochloride and D and DL-cysteine hydrochloride, free bases of L and D and DL-cysteine, L-cysteine monophosphate, di-L-cysteine sulfate and L-mono-cysteine tartrate. Homo-cysteine is likewise related to the foregoing compounds and can be used.

As noted, the dried whey employed in the additive composition is most easily obtained from commercial processes for the manufacture of cheese such as cheddar, Swiss and/or cottage cheese. One process commercially employed for the manufacture of a satisfactory whey powder involves evaporating the raw whey form such cheese processing to produce a concentrate containing from 30 to 55% solids, followed by spray drying. A particularly satisfactory product is obtained by spray drying and atomizing sweet cheddar whey to obtain a spray-dried, hydrate form of the whey, thus producing a nonhydroscopic crystalline product. Such product having been dried in the hydrate state, at least initially, can be further processed to a desired particle size. For example, a granular form of whey may range in particle size from 74 to 420 microns. If desired, whey granules in the hydrate state can be processed to provide very fine particles ranging in size from 50 to 200 microns. Such processing normally involves both spray drying and atomizing steps according to conventional procedures.

It is also desirable that the whey be demineralized, for example by techniques as disclosed in U.S. Pat. 2,465,906. As therein generally described, a demineralized whey is produced by a suitable demineralizing operation, as by contacting the liquid whey with ion exchange resins. As is well known, removal of mineral salts from a liquid material can be effected by passing the material successively through columns of cation and anion exchange resins. Contact with the cation exchange resin serves to remove such metal ions as calcium, magnesium, sodium, potassium and iron. Contact with the anion resin removes such ions as phosphorous, chlorine, iodine, and fluorine. Demineralizing of the liquid whey not only reduces its sodium content, but in addition it removes other minerals and undesired acidic components introduced into the whey by the process from which the whey may be a byproduct (viz., the manufacture of cheddar cheese).

The term ascorbic acid as used herein refers to L-ascorbic acid (Vitamin C). While ascorbic acid also exists in other forms, for example the isomer D-arabo-ascorbic acid, L-ascorbic is preferred because of its greater effectiveness in the additive composition and its ready availability as Vitamin C. While the precise function of ascorbic acid in the four component additive composition of the present invention is not precisely known, it is well known that L-ascorbic acid is converted to an oxidized form (dehydro-L-ascorbic acid) by enzymes and trace metals present in the flour system. One of the reactions that most likely takes place, therefore, is the oxidation of the flour protein by dehydro ascorbic acid to a polymeric form which strengthens the gluten chains in the dough. However, the dehydro ascorbic acid may also serve, particularly in an oxygen poor system, to protect the sulfhydryl groups of the amino acid reducing substance by slowing the rate of oxidation of these groups.

Soya protein as used in the present invention is most easily supplied in the form of a defatted soya flour or a concentrate of such flour. Soya flours are normally prepared by cleaning and dehulling soy beans, cracking the soy bean cotyledons and thereafter tempering the cracked beans with heat to produce flakes. In accordance with the present invention, the soy bean flakes are defatted with a suitable solvent (viz., commercial hexane), following which the defatted flakes are desolventized, heat treated, ground and mechanically classified. The resulting defatted soya flour has a protein content of the order of 50 to 55%, a light cream color, and a particle size as determined by screening (U.S. Standard Sieve series) where a minimum of 95% is retained on a 200 micron sieve and 98% on a 100 micron sieve.

The invention additionally contemplates the use of a defatted soya flour concentrate, obtained by extracting sufficient carbohydrate from the flour to increase the proportion of protein within the range of 60 to 70% protein or higher. Also, it is possible to use a soya protein isolate (approximately 90% soya protein) obtained by treating soya flour with acid/base compositions to remove substantially all of the carbohydrate. However, while the soya protein appears to actively contribute to the beneficial effects of the additive composition, the precise nature of the active ingredient derived from the soya flour is not fully understood. Thus, conventional enzyme active, full fat soya flours normally function in dough systems as oxidizing agents. However, the defatted soya flours used in the present invention apparently provide, at least in part, a reducing effect. This result is believed to follow from the absence of the lipoxidate enzymes which normally serve to initiate the oxidizing effect. As a consequence, the soya component may also serve to protect the sulfhydryl groups in the amino acid reducing substance, in a system containing both acorbic acid and soya protein.

In general, and assuming that the new additive composition is formulated from an amino acid reducing substance (e..g, L-cysteine HCl), dried whey (e.g., demineralized sweet whey), ascorbic acid (e.g., L-ascorbic acid), and dried soya protein (e.g., defatted soya flour), the proportions may range as follows:

|  | Percent |
| --- | --- |
| L-cysteine HCl | 0.5–2.0 |
| L-ascorbic acid | 1.0–3.0 |
| Dried whey | 20–40 |
| Soya flour | 25–80 |

The foregoing general range of ingredients and proportions is specified to make clear that the new additive composition is not limited to precise ingredients, nor to a specific proportioning of the ingredients in the additive mxture, as may hereinafter be disclosed by way of example.

As noted previously, the desired characteristics of the new additive composition can be utilized by adding the additive composition along with other ingredients during the mixing to form the dough, for example at Step 10 in FIG. 1. Assuming proportions of active ingredients within the above general range, the additive composition may be employed in a proportion ranging from 0.25 to 0.5% on the weight of the flour in the dough. It is a feature of the invention that within this general range, the proportion of additive composition may be varied, upward or downward as may be necessary or desirable to accommodate characteristics of the flour (e.g., low protein versus high protein), or to accommodate different dough mixing equipment according to the mixing efficiency. By way of illustration, dough mixing equipment employed in the United States is customarily operated at relatively higher speeds (e.g., 90 r.p.m.) than the same or equivalent machinery used in certain European markets such as Holland, where the mixer is operated at relatively lower speeds (e.g., 40 r.p.m.). In general, the proportion of additive composition and the mixing speed and time can be adjusted to provide the most beneficial results for the particular bakery operation involved. In like fashion, emphasis of a particular bread characteristic in the finished loaf of bread, such as tightness or openness of grain, or the specific volume of the loaf, can be influenced by modest changes in the level of the additive composition, taking into account the particular flour. A fundamental advantage of the invention therefore is the adaptability of the new additive composition to differing processing equipment and dough systems, to provide greatly reduced mixing and proofing requirements, without any loss of desired reproducible dough and product characteristics.

A particular advantage of the additive composition is the degree of flexibility made available to the baker in producing bakery products to meet changing requirements. For example, in many marketing areas, it is customary during work days to produce a standard bread having a relatively compact form and uniform specific volume, but on the week-end to produce a loaf of higher volume (so-called "balloon bread") which has a much greater specific volume. The new additive composition of the present invention is particularly adapted to such varying requirements, both as to use and ultimate product characteristics. The additive composition is consequently uniquely adapted to meeting the variable standards for bread and other bakery products as may be established in varying regions of a particular country, or in different countries.

Keeping in mind the essential range of proportions of the additive composition, and the proportion of the additive composition based on the flour as set forth above, the following table sets forth operable ranges as well as an optimum proportion of the several active ingrgedients, in virtually any type of a dough mix for bread or rolls, expressed as a percent of the flour:

| Additive component | Percent of flour | |
|---|---|---|
| | Operable range | Optimum |
| L-cysteine HCl | 0.003-0.010 | 0.0045 |
| L-ascorbic acid | 0.005-0.015 | 0.0070 |
| Dried whey | 0.10-0.20 | 0.125 |
| Soya flour | 0.12-0.40 | 0.250 |

It will be understood that an additive composition made up of the specific ingredients, at the optimum or within the foregoing operable range, is selected in accordance with the particular dough and product characteristics desired, but in all cases within the range of 0.25 to 0.5% on the weight of the flour. Use of the additive composition is likewise generally in accordance with the processing as exemplified in FIG. 1.

The following examples are intended to be illustrative of the practice of the present invention, and also of the beneficial use of the new additive composition. In these examples all concentrations of ingredients are expressed as percent of the flour.

EXAMPLE 1.—NORMAL WHITE BREAD DOUGH FORMULA

| | Regular mix | With additive |
|---|---|---|
| Ingredients: | | |
| Flour (Konings) | 100.0 | 100.0 |
| Yeast | 3.0 | |
| Salt | 2.0 | 2.0 |
| Water | 52.0 | 32.0 |
| Fat | 2.0 | 2.0 |
| Sugar | 1.0 | 1.0 |
| Emulsifier | | 0.25 |
| Calcium steroyl lactylate | | 0.25 |
| Brew: | | |
| Flour | | 10.0 |
| Yeast | | 3.0 |
| Water | | 20.0 |
| Additive: | | |
| L-cysteine HCL | | 0.006 |
| Ascorbic acid | | 0.007 |
| Dried whey | | 0.125 |
| Soya flour | | 0.250 |

Procedure—Regular

1. Combine all ingredients and mix 20-25 minutes at 36 r.p.m.
2. Ferment for 45 minutes in mixer.
3. Knock down dough.
4. Allow recovery time of 10 minutes.
5. Divide and round.
6. Proof (intermediate) for 35-40 minutes.
7. Mould.
8. Proof (final) for 60 minutes.
9. Bake at 400° for 22 minutes.

Procedure—With additive

1. Mix all ingredients for 12 minutes at 36 r.p.m.
2. Ferment for 15 minutes at 100° F. (Optional)
3. Divide and round.
4. Proof (intermediate) for 15 minutes.
5. Mould.
6. Proof (final) for 45-52 minutes to a 3 cm. height.
7. Bake for 20-22 minutes at 400° F.

Results

Use of the new additive composition in the formulation reduced the mixing time to about half (from 20-25 minutes to 12 minutes). The fermentation-proof time was likewise substantially reduced from approximately 2 hours and 20 minutes to an hour and 15 minutes. In contrast, the volume of the loaf made with the additive was increased to 2,185 cc., as compared to 2,000 cc. for the regular mix, and had a specific volume of 5.21 as compared to 5.0. The texture of the loaf made with the additive was also greatly improved having a grain (on a scale from 0 to 10) of 9.3 as compared with 8.5, and a measure of external appearance (measured on a scale from 0 to 30) of 24 as compared with the 16. The foregoing results are summarized in Table I (Example 5). In general, the taste and aroma of the bread made with the additive is excellent, and at least equal to the regular bread. The toasting quality is also excellent.

EXAMPLE 2—White bread

Dough formula

Ingredients:
| | |
|---|---|
| Flour | 90.0 |
| Salt | 2.0 |
| Water | 32.0 |

Brew:
| | |
|---|---|
| Flour | 10.0 |
| Yeast | 2.4 |
| Water | 20.0 |

Additive:
| | |
|---|---|
| Sucrose | 1.0 |
| Fat | 1.39 |
| Calcium steroyl lactylate | 0.225 |
| L-cysteine HCl | 0.0045 |
| Ascorbic acid | 0.0070 |
| Dried whey | 0.125 |
| Soya flour | 0.250 |

Procedure

The procedure is the same as described in conjunction wth use of the additive in Example 1, except that the cysteine, ascorbic acid, whey, soya, sucrose, calcium steroyl lactylate and fat were all dry blended to form one ingredient which was then combined in a dry mix with all the rest of the ingredients, including the brew.

Results

The results were substantially the same as obtained with the use of the additive in Example 1. (See Table I in Example 5.)

EXAMPLE 3.—WEEK-END BREAD DOUGH FORMULA

| | Regular mix | With additive |
|---|---|---|
| Ingredients: | | |
| Flour | 100.0 | 90.0 |
| Yeast | 3.0 | |
| Salt | 2.0 | 2.0 |
| Water | 54.0 | 34.0 |
| Emulsifier | | 0.25 |
| Calcium steroyl lactylate | | 0.25 |
| Brew: | | |
| Flour | | 10.0 |
| Yeast | | 3.0 |
| Water | | 20.0 |
| Additive: | | |
| L-cysteine HCL | | 0.006 |
| Ascorbic acid | | 0.007 |
| Died whey | | 0.125 |
| Soya flour | | 0.250 |

Procedure—Regular

1. Mix all ingredients for 20–25 minutes at 36 r.p.m.
2. Ferment for 45 minutes at 100°.
3. Knock down dough.
4. Allow recovery time of 10 minutes.
5. Divide and round.
6. Proof (intermediate) for 35–40 minutes.
7. Mould.
8. Proof (final) for 60 minutes at 100°.
9. Bake for 22 minutes at 400° F.

Procedure—With additive

1. Mix all ingredients for 12 minutes at 36 r.p.m.
2. Ferment for 15 minutes at 100° F. (Optional)
3. Divide and round.
4. Proof (intermediate) for 15 minutes.
5. Mould.
6. Proof (final) for 45–52 minutes to a 3 cm. height.
7. Bake at 400° F. for 20–22 minutes.

Results

The mix time for the bread made with the additive was substantially reduced from 20–25 minutes to only 12 minutes, and the proof time was substantially reduced from 2 hours and 15 minutes to slightly over an hour, as compared with the bread made by the regular process. Bread made with the additive composition had a greater volume (2300 cc. as compared to 2200), and a substantially improved texture measured in terms of the grain (9.0 as compared to 8.5), and the external appearance (22 as compared with 20). These results, which demonstrate the effectiveness of the new additive composition in the production of week-end or "balloon" bread, are set forth in tabular form in Example 5.

EXAMPLE 4—Week-end bread

Dough formula

Ingredients:
  Flour _____ 90.0
  Salt _____ 2.0
  Water _____ 35.0
Brew:
  Flour _____ 10.0
  Yeast _____ 2.4
  Water _____ 20.0
Additive:
  Dextrose _____ 3.11
  Calcium steroyl lactylate _____ 0.50
  L-cysteine HCl _____ 0.0045
  Ascorbic acid _____ 0.007
  Dried whey _____ 0.125
  Soya flour _____ 0.250

Procedure

The additive composition (comprising calcium steroyl lactylate, dextrose, cysteine, ascorbic acid, whey and soya) was formed by dry blending the various ingredients to form a single additive composition which was then combined in a dry mix with all the rest of the ingredients. In other respects the procedure was the same as in Example 3, with respect to the bread made with the new additive composition.

Results

In addition to the reduced mixing and proofing requirements, similar to those noted in Example 3, a specialized week-end or "balloon" bread was obtained having substantially improved characteristics. Specifically, the specific volume was increased to 5.50 as compared to 5.25 for the normal bread, and the volume was substantially increased (2300 cc. as compared to 2200). Substantial improvement was also noted in the bread characteristics, measured in the terms of the grain (10.0 as compared to 8.5) and the external appearance (28.5 as compared to 20). Again, the data are summarized in Table I, Example 5.

EXAMPLE 5—Summary of results

For convenience, the test data with respect to the breads produced in accordance with the foregoing examples are summarized in the following table. In general, the indicated measurements were obtained in accordance with standards generally accepted within the baking industry.

TABLE I

| Example | Volume | Grain [1] | External appearance [2] | Specific volume, grams per cc. |
|---|---|---|---|---|
| 1—Regular | 2,000 | 8.5 | 16 | 5.0 |
| 1—With additive | 2,185 | 9.3 | 24 | 5.21 |
| 2 | 2,070 | 9.0 | 24 | 5.10 |
| 3—Regular | 2,200 | 8.5 | 20 | 5.50 |
| 3—With additive | 2,300 | 9.0 | 22 | 5.50 |
| 4 | 2,350 | 10.0 | 28.5 | 5.60 |

[1] Scale—0–10 (10 is maximum).
[2] Scale—0–30 (30 is maximum).

The foregoing examples were chosen to illustrate the use of the new additive composition in a short time process for making several types of bread, under somewhat different conditions of formula and mixing procedure. It is not practical or feasible to illustrate all possible variations by way of specific example, and the disclosures and descriptions herein should consequently be considered as merely illustrative and not in any sense limiting.

What is claimed is:

1. A process for making leavened bread and like bakery products with greatly reduced but controllable mixing and proofing requirements, to provide bakery products of desired reproducible characteristics, comprising the steps of adding to conventional dough ingredients including flour, yeast, salt and water, from 0.25 to 0.5% on the weight of the flour of an additive composition consisting of a mixture of (a) from 0.003 to 0.010% amino acid selected from the group consisting of cysteine, glutathione and mixtures thereof (b) from 0.005 to 0.015% ascorbic acid (c) from 0.10 to 0.20% dried whey and (d) from 0.12 to 0.40% dried soya protein, mixing said dough ingredients and additive composition to form a dough, dividing said dough into units for baking, and thereafter proofing and baking said dough units, the entire processing through mixing, dividing and proofing requiring no more than 90 minutes.

2. A process as in claim 1 wherein the dried whey is obtained by initially spray drying liquid whey to obtain a spray-dried hydrate form of the whey, which is then processed to a desired particle size.

3. A process as in claim 1 wherein the ascorbic acid is in the form, L-ascorbic acid.

4. A process as in claim 1 wherein the dried soya protein is present in a member selected from the group consisting of defatted soya flour, defatted soya flour concentrate, soya protein isolate or mixtures thereof.

5. A process as in claim 1 wherein said dough ingredients and additive composition are mixed to form a dough within a period of 8 to 15 minutes.

6. A process as in claim 1 wherein said dough is mixed and subjected to intermediate proofing, molding and final proofing, within a period of from 60 to 90 minutes.

7. A process as in claim 6 wherein said dough is subjected to intermediate proofing for a period of 12 to 20 minutes and to final proofing for a period of 40 to 60 minutes.

8. An additive composition for controlling processing as well as product characteristics in short time processes for making leavened bakery goods of desired reproducible characteristics, comprising a mixture of dried ingredients composed of (a) from 0.003 to 0.10% amino acid selected from the group consisting of cysteine, glutathione and mixtures thereof (b) from 0.005 to 0.015% ascorbic acid (c) from 0.10 to 20% dried whey and (d) from 0.12 to 0.40% soya protein.

9. A composition as in claim 8 wherein said amino acid is L-cysteine HCl.

10. A composition as in claim 8 wherein said dried whey is of relatively fine particle size of the order of 50 to 200 microns.

11. A composition as in claim 8 wherein said dried whey is in the form of granular particles of the order of 74 to 420 microns in size.

12. A composition as in claim 8 wherein the ascorbic acid is in the form, L-ascorbic acid.

13. A composition as in claim 8 wherein said soya protein is present in a member selected from the group consisting of defatted soya our, defatted soya flour concentrate and soya protein isolate, or mixture thereof.

14. An additive composition as in claim 8 wherein said mixture of dried ingredients (a), (b), (c) and (d) is dispersed in a conventional dough ingredient in semiliquid form.

15. An additive composition as in claim 14 wherein said conventional dough ingredient is shortening.

16. A composition as in claim 14 wherein said conventional dough ingredient is shortening plus emulsifier.

17. An additive composition especially adapted for use in a controlled short time batch process for making leavened bread, comprising:

| Ingredient: | Percent |
|---|---|
| L-cysteine HCl | 0.5–2.0 |
| L-ascorbic acid | 1.0–3.0 |
| Dried whey | 20–40 |
| Soya flour | 40–80 |

References Cited
UNITED STATES PATENTS

| 3,053,666 | 9/1962 | Henika et al. | 99—91 X |
| 3,252,807 | 5/1966 | Kuramoto | 99—91 X |

RAYMOND N. JONES, Primary Examiner

J. R. HUFFMAN, Assistant Examiner

U.S. Cl. X.R.
426—23, 25, 187, 226